UNITED STATES PATENT OFFICE.

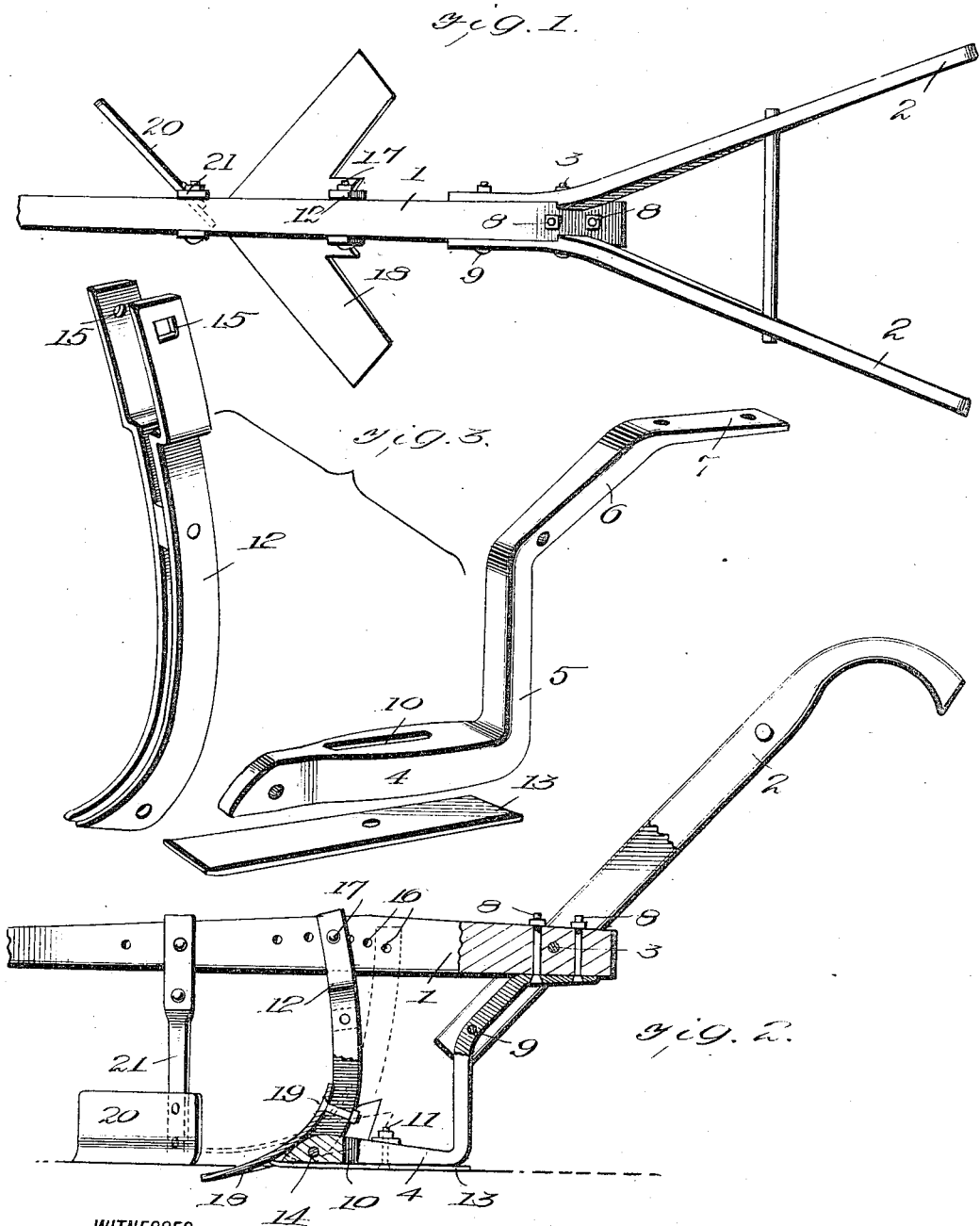

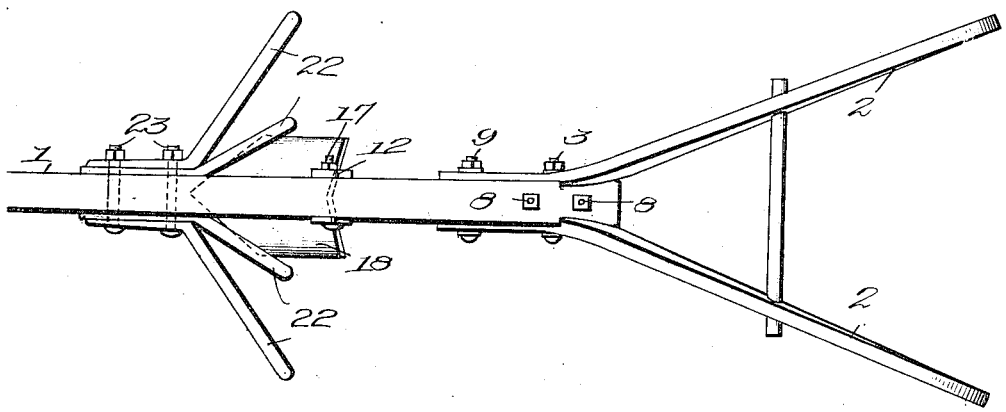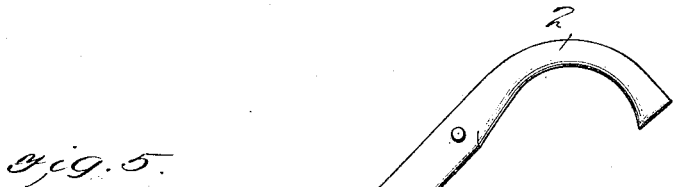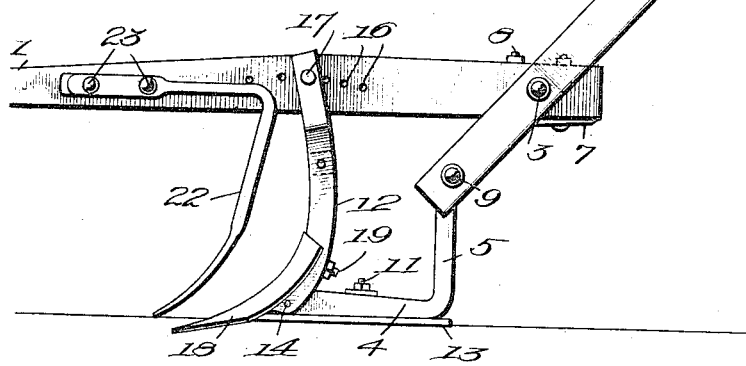

GEORGE BLEDSOE, OF CLINTON, NORTH CAROLINA.

PLOW.

1,267,502.     Specification of Letters Patent.     Patented May 28, 1918.

Application filed February 12, 1916. Serial No. 77,933.

*To all whom it may concern:*

Be it known that I, GEORGE BLEDSOE, a citizen of the United States, and a resident of Clinton, in the county of Sampson and State of North Carolina, have invented a new and useful Improvement in Plows, of which the following is a specification.

The present invention relates to agricultural implements for tilling the soil, being designed more particularly as an improvement on the type of implement for preparing the soil for receiving grain and which may be used for cultivating after the seed has germinated.

The invention consists of a beam, a runner having rigid connection with the beam, a standard pivotally connected at its lower end to the runner and adjustably connected at its upper end to the beam, and a blade attached to the standard and adjustable therewith for varying its pitch according to the nature of the work and character of the soil.

The invention also consists of an implement which may be readily converted and adapted to meet varying conditions of work, soil and climate, so as to operate with the same efficiency in either capacity as an implement especially constructed for the particular requirement.

The invention further consists of the novel features and details of construction, which hereinafter will be more fully disclosed and claimed.

The drawings illustrate the preferred embodiment of the invention; however, in adapting the same to meet the many exigencies arising, it is to be understood that various changes in the form, proportion, and minor details of construction may be resorted to without departing from the nature of the invention.

In the drawings:—

Figure 1 is a top plan view of the implement,

Fig. 2 is an elevation partly in section,

Fig. 3 is a detail perspective view of the standard and runner, the parts being separated, Fig. 4 is a top plan view of a modification, and Fig. 5 is a side view of the modification illustrated in Fig. 4.

Corresponding and like parts are referred to in the following description and indicated in all the views of the drawings by the same reference characters.

The implement comprises a beam 1, which may be of any approved construction. Handle bars 2 are rigidly connected to the rear end of the beam 1 and have their lower ends projecting below such beam for a short distance, the projecting ends coming upon opposite sides of the part of the runner which is rigidly attached to the beam. Opposite sides of the beam 1 are mortised to receive the handle bars which are secured thereto by means of a transverse bolt 3.

The runner comprises a longitudinal bar 4, an upright portion 5, an inclined portion 6 and a horizontal portion 7. These several parts are of integral formation, the runner being rigidly connected to the beam in any substantial way. The horizontal portion 7 of the runner underlies the rear end of the beam 1 and comes between the lower ends of the handle bars 2 and is secured to the beam by means of vertically disposed bolts or fastenings 8. The inclined portion 6 of the runner constitutes in effect a brace and is disposed between the depending ends of the handle bars and is secured to the lower ends of such handle bars by means of a transverse bolt or fastening 9. The longitudinal member or bar 4 of the runner is formed with a slot 10, which extends vertically and longitudinally of the runner and receives a bolt or fastening 11. The forward end of the member 4 is reduced and passes between the members comprising the standard 12.

A shoe 13 is fitted to the under side of the member 4 and projects laterally and forward and rearwardly from such member. The bolt or fastening 11 serves to secure the shoe 13 to the runner in the desired adjusted position. The shoe 13 may be case hardened, or otherwise treated so as to sustain the wear without frequent replacement.

The shoe 13, in conjunction with the longitudinal bar or member 4 of the runner, serves to steady the implement when in operation and prevents any side draft when the shovel blade is of the variety tending to throw the earth to one side.

The standard 12 comprises complemental members which are transversely spaced and have their upper ends spread so as to extend along opposite sides of the beam 1. The lower ends of the members comprising the standard receive the reduced end of the members 4 between them and are connected to such member by means of a pivot fastening 14, which may consist of a bolt, rivet or the like. The upper ends of the members comprising the standard are formed with openings 15, which are adapted to register with a series of openings 16, formed in the beam 1 in concentric relation with the pivot fastening 14. A bolt or fastening 17 is adapted to pass through registering openings 15 and 16 so as to secure the standard 12 in the required adjusted position.

A shovel blade 18 is secured to the standard 12 by means of a bolt or fastening 19, the latter extending through an opening formed in the shovel blade and passing between the members comprising the standard 12. The shovel blade 18 may be of any design or construction depending upon the character of the work to be performed or the nature of the soil. The shovel blade moves with the standard 12 when the latter is adjusted by turning the same about the pivot fastening 14.

As indicated in Figs. 1 and 2, the implement is provided with a scraper, the same consisting of a blade 20 and an upright 21, the latter being secured to the beam 1 in any substantial and preferred way. The blade 20 has its lower portion curved forwardly so as to scrape the surface of the ground and remove trash or other obstructing material. The scraper is preferably disposed with the blade 20 inclining outwardly and forwardly so as to throw the trash against the opposite wing of the shovel blade 18 and away from the plants being cultivated.

In the modification shown in Figs. 4 and 5, the implement is adapted for use as a cultivator and harrow and in addition to the parts hereinbefore described a harrow or cultivator attachment is provided, the same being connected to the beam 1. The harrow or cultivator attachment comprises a plurality of teeth 22, which have their upper ends brought together upon opposite sides of the beam 1 and attached thereto by bolts or fastenings 23, the latter passing through registering openings formed in the upper ends of the teeth 22 and in the beam 1. The teeth 22 curve throughout their length and their lower rear ends are spread so as to occupy regular spaced positions. The points of the teeth 22 are preferably disposed in transverse alinement and the teeth are located in equal number upon opposite sides of the beam. The cultivator or harrow attachment is disposed so as to operate upon the soil in advance of the shovel blade 18, the purpose being to break up clods and to pulverize and level the soil.

It is observed that the forward end of the shoe 13 underlies the lower end of the standard 12, thereby preventing clogging of the joint between such standard and runner. When it is required to adjust the pitch of the shovel blade 18 the fastening 17 is removed and the upper end of the standard 12 moved forward or rearward as may be required, such standard turning upon the pivot fastening 14. The standard with the shovel blade is secured in the adjusted position by replacing the fastening 17 through registering openings formed in the standard and beam.

The implement is constructed with special reference to its easy control, ready adaptation to the many conditions met with in the use of implements of this character and ease and facility of adjustment to vary the depth of operation of the shovel blade or like part attached to the standard.

It is observed that the handle bars 2 have a firm and rigid connection with the beam and plow, the latter serving as bracing means for the handle which will in turn act as a stay for the runner, there being a mutual coöperation between such parts. The runner in addition to forming a support for the standard 12 and a brace for the handle bars also serves as means for steadying the implement when in operation, said runner being braced at its lower forward end by the standard 12, which as indicated extends between the free end of the member 4 and the beam.

I claim:—

In an implement of the character set forth, a beam, inclined handle bars connected with the rear of the beam, a runner comprising a lower portion substantially parallel with the beam and an upwardly extending portion at the rear of the horizontal portion having at its upper end an inclined portion secured to the beam, the handle bars being connected to the runner at the junction of the upwardly extending and inclined portions, the horizontal portion having a vertically disposed longitudinal slot intermediate its ends, a standard pivoted to the forward end of the said portion of the runner and having at its upper end portions extending on opposite sides of the beam, said beam having a series of openings concentric with the pivotal connection of the standard and the runner, the portions of the standard having an opening adapted to register therewith to receive a securing means, and a shovel blade attached to the standard and movable therewith, a shoe beneath the horizontal portion of the runner, and a bolt passing through the shoe and the slot for adjustably connecting the shoe to the runner.

GEORGE BLEDSOE.

Witnesses:
R. W. HERRING,
H. B. ABEL.

Copies of this patent may be obtained for five cents each, by addressing the "Commissioner of Patents, Washington, D. C."